Patented July 7, 1936

2,046,469

UNITED STATES PATENT OFFICE 2,046,469

PROCESS FOR THE PREPARATION OF HALOGENATED ORGANIC HYDROXY COMPOUNDS

Siegfried Leonard Langedijk, Amsterdam, Netherlands, assignor to Shell Development Company, San Francisco, Calif., a corporation of Delaware No Drawing. Application May 28, 1935, Serial No. 23,867. In the Netherlands July 25, 1931

10 Claims. (Cl. 260—157)

This invention relates to the preparation of halogenated organic hydroxy compounds, such as the halohydrins, wherein a hydroxyl group and a halogen atom are linked to different carbon atoms of an aliphatic radical.

Various processes are known for the preparation of additive compounds of hypohalogenous acids, such as hypochlorous or hypobromous acid, with organic compounds having two or more unsaturated carbon atoms in the molecule. According to these known processes, the additive compounds are generally prepared either with the aid of free hypochlorous or hypobromous acid, or with the aid of mixtures of chlorine or bromine and water. These substances are then caused to react in diluted condition with the unsaturated compounds.

There are various objections to the known processes, which, for the greater part, may be summarized as follows:

When causing chlorine or bromine to react with water, halogen hydrides are formed, which hinder the formation of hypochlorous acid and hypobromous acid. As a result, free halogen comes to be present in the solution according to the reaction: $H.Hal + HO.Hal \rightarrow H_2O + Hal_2$, giving rise to the formation of a dihalogenide with the unsaturated organic material instead of the desired additive compounds of hypochlorous acid and hypobromous acid. In those cases where it is yet possible by means of some special contrivances to prepare a concentrated solution of hypochlorous acid or hypobromous acid, such solution is very unstable, which makes it very difficult to work with.

I have found that the above mentioned objections are practically entirely removed when an ester of a hypohalogenous acid is caused to react, in the presence of water, with an organic hydroxy compound which is relatively readily dehydratable to an unsaturated compound under the reaction conditions.

The ester radical may be of a primary character as the methyl, ethyl, n.propyl or n.butyl and other primary homologues, or may be of a secondary character as the isopropyl, secondary butyl, secondary amyl or secondary hexyl and higher secondary homologues, or may be, preferably, of a tertiary character as the tertiary butyl, tertiary amyl or tertiary hexyl and higher homologues. The above aliphatic radicals may be linked to carbocyclic or heterocyclic nuclei.

It is preferable to operate with tertiary esters of hypohalite acids as they are the most stable of the hypohalite esters; therefore, for illustrative purposes only, reference will be had to the preferred embodiment of the invention of which tertiary butyl hypohalite is exemplary, although it is to be understood that in certain instances, it may be preferable to employ primary or secondary esters of a hypohalogenous acid at relatively low temperatures and with or without the use of inert solvents or stabilizers.

The advantages of the process, according to the invention, lie in the fact that it is possible to prepare with comparatively small quantities of water, a concentrated halohydrin solution which does not contain any free hydrogen halide, cannot be decomposed, as is the case with a concentrated HOCl or HOBr solution, and in which alcohol is present as the only by-product. The presence of the alcohol further does not hinder the reaction. The said alcohol can be recovered by any of the known methods, and used again for the preparation of an ester of a hypohalogenous acid.

As an alternative procedure, one can bring the relatively readily dehydratable organic hydroxy compound into reactive contact with an aqueous solution of a hypohalogenous acid whereby a halohydrin is obtained.

If the hypohalite ester or hypohalogenous acid is free from elementary halogen or hydrogen halide, only the halogenated organic hydroxy compound is obtained. Part of the halohydrins can be isolated as such from the reaction mixture if they are salted after distillation.

The reaction proceeds more quickly with organic hydroxy compounds corresponding to tertiary alcohols than with organic hydroxy compounds corresponding to primary and secondary alcohols.

The esters of tertiary alcohols with hypohalogenous acids, as hypochlorous or hypobromous acid, can be prepared in a known manner, for example, by passing chlorine or bromine into a mixture of water, tertiary alcohol and alkali hydroxide or another substance with basic reaction while cooling, whereby the ester is separated practically quantitatively as an upper layer on the reaction liquid. In the preparation of the primary and secondary esters of hypohalogenous acids, greater precautions as to stabilizing agents and temperatures must be observed in view of their unstability and tendency to explode.

The physical state of the components of the reaction may be varied so that the process is conducted in a liquid or mixed vapor-liquid phase.

In the process, according to the invention, tertiary butyl alcohol, the tertiary amyl alcohols, the tertiary hexyl alcohols and the like, may, for example, be taken into consideration as tertiary alcohols, as may mixed alcohols which contain a primary or secondary alcohol grouping besides the tertiary alcohol grouping.

*Example I*

¼ mol. of tertiary butyl alcohol (18.5 grams) of 95% (the rest being water), and ¼ mol. of tertiary butyl hypochlorite (27 grams) are boiled together for 2 hours, under application of a reflux cooler. At the end of the process hypochlorite could no longer be traced in the reaction product. The reaction mixture was completely soluble in a five-fold quantity by volume of water. The following fractions were obtained by distillation:

1. Boiling between 73 and 84° C.: 19.1 grams= tert. but. alc.
2. Boiling between 84 and 110° C.: 9.7 grams= transitional fraction.
3. Boiling between 110 and 135° C.: 15 grams= isobutylene chlorohydrin.

The reaction probably took place as follows: The tertiary butyl alcohol gave rise to the formation of isobutylene and water, whilst the isobutylene formed was converted with water and tertiary butyl hypochlorite into isobutylene chlorohydrin and tertiary butyl alcohol. In fact water-free tertiary butyl alcohol and pure hypochlorite when heated in the same ratio in the absence of water, give rise to the formation of tertiary butyl alcohol, acetone, methyl chloride and a little chlorohydrin. Further when boiling ¼ mol. of tertiary butyl hypochlorite with ½ cc. water for 24 hours, only traces of chlorohydrin are formed, the main product being tertiary butyl alcohol. Thus water has not a converting, but a practically exclusively hydrolyzing action on the hypochlorite.

The process can be executed in a batch, intermittent or continuous manner.

Higher primary or secondary alcohols come into consideration for the production of chlorohydrin.

As examples of the use of higher alcohols with which a considerable loss of water is to be expected during the reaction, may be mentioned n. hexadecyl alcohol, cetyl alcohol and isoheptadecyl alcohol, a secondary alcohol obtained as follows: a heptadecene fraction produced from a vapor phase cracked distillate of white paraffin wax was sulfated, after which the sulfuric ester formed was hydrolyzed and the alcohol obtained, after having been purified, distilled in vacuo. The alcohol was crystallized at room temperature. It boiled between 192° C. and 200° C. at a pressure of 27 mm. and had an acetyl saponification number of 189. When allowing tertiary butyl hypochlorite, for example, to react upon these alcohols, it was found that more than 50% of the theoretical quantity of chlorohydrin is obtained.

*Example II*

121 gr. cetyl alcohol, 250 cc. pentane and 8.9 gr. water were stirred together, after which 135.5 gr. tertiary butyl hypochlorite were added drop by drop in 100 minutes. At the end of the addition of the drops the original temperature of the mixture, viz: −7° C., had risen to −3° C. Then the cooling liquid was removed, so that the temperature of the mixture could rise to room temperature. When it was 25° C. it suddenly increased to 65° C. A spontaneous reaction occurred. After having cooled down, the weight of the mixture left was 210 gr. It then no longer showed a reaction on KI and acetic acid, so that apparently the tertiary hypochlorite had entirely disappeared. Distilling was then carried out at ordinary pressure, when 43.7 gr. tertiary butyl alcohol was obtained. Subsequently a further 11.4 gr. was distilled off in vacuo at 55° C., consisting of a mixture of tertiary butyl alcohol and about 23% isobutylene chlorohydrin. Finally distilling was continued at a pressure of 35 mm. At 219° C. 65.2 gr. of a light-colored distillate distilled off, which according to its chlorine, oxygen and hydroxyl content appeared to consist for the greater part of cetene chlorohydrin and cetene oxide. The residue weighing 60 gr. contained, according to this analysis, a high percentage of cetene oxide.

*Example III*

To a mixture of 25 gr. isoheptadecyl alcohol, 50 cc. pentane and 1.8 gr. water having an initial temperature of −3° C., 20 gr. tertiary butyl hypochlorite was added drop by drop in half an hour, after which the temperature rose to 14° C. After having been left to stand for some time the temperature suddenly increased to 60° C., so that apparently a spontaneous reaction took place. Subsequently, when steaming off in vacuo to 100% C., a residue was obtained which, according to its oxygen content, its hydroxyl content and the quantity of chlorine separated off by treatment with KOH under mild conditions, consisted of 37.5% heptadecylene chlorohydrin, 45.3% heptadecylene oxide and 17.2% other chlorine compounds, whilst practically nothing of the original secondary alcohol appeared to be left.

This application is a continuation-in-part of my application Serial No. 623,903, filed July 21, 1932.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. A process for the preparation of halohydrins which comprises reacting a member of the class consisting of hypohalogenous acids and hypohalite esters containing an alkyl group contiguous to the hypohalogenous acid radical with a readily dehydratable alcohol in the presence of water.

2. A process for the preparation of halohydrins which comprises reacting a member of the class consisting of hypohalogenous acids and hypohalite esters containing an alkyl group contiguous to the hypohalogenous acid radical with a tertiary alcohol in the presence of water.

3. A process for the preparation of halohydrins which comprises reacting a tertiary alkyl ester of a hypohalogenous acid with a readily dehydratable alcohol in the presence of water.

4 A process for the preparation of halohydrins comprising, heating an alcohol containing a plurality of carbon atoms to the molecule and decomposable under reaction conditions to an olefine in the presence of a hypohalite ester containing an alkyl group contiguous to the hypohalogenous acid radical and water.

5. A process for the preparation of halohydrins comprising, heating an aliphatic tertiary alcohol containing a plurality of carbon atoms to the molecule in the presence of a hypohalite ester containing an alkyl group contiguous to the hypohalogenous acid radical and water.

6. A process for the preparation of halohydrins comprising, heating an aliphatic alcohol containing a plurality of carbon atoms to the molecule and decomposable under reaction conditions to an olefine in the presence of a tertiary ester of a hypohalogenous acid containing an alkyl group contiguous to the hypohalogenous acid radical and water.

7. A process for the preparation of chlorohydrins comprising, heating an aliphatic monohydric alcohol containing a plurality of carbon atoms to the molecule and decomposable under reaction conditions to an olefine in the presence of a tertiary ester of hypochlorous acid containing an alkyl group contiguous to the hypochlorous acid radical and water.

8. A process for the preparation of chlorohydrins comprising heating a readily dehydratable alcohol with tertiary butyl hypochlorite in the presence of water.

9. A process for the preparation of a chlorohydrin which comprises heating tertiary butyl alcohol with tertiary butyl hypochlorite in the presence of water.

10. A process for the preparation of a chlorohydrin which comprises heating tertiary amyl alcohol with tertiary butyl hypochlorite in the presence of water.

SIEGFRIED LEONARD LANGEDIJK.